US010519682B2

United States Patent
Schloss et al.

(10) Patent No.: US 10,519,682 B2
(45) Date of Patent: Dec. 31, 2019

(54) SANITIZATION CHAMBER FOR A POOL CLEANER

(71) Applicant: Aquatron Robotic Technology Ltd., Afula (IL)

(72) Inventors: Shahar Schloss, Haifa (IL); Elad Dadon, Afula (IL); Arnold Goodez, Migdal Haemek (IL); Jane Hazen, Afula (IL); Tom Rash, Nofit (IL)

(73) Assignee: Aquatron Robotic Technology Ltd., Afula (IL)

( * ) Notice: Subject to any disclaimer, the term of this patent is extended or adjusted under 35 U.S.C. 154(b) by 0 days.

(21) Appl. No.: 15/987,903

(22) Filed: May 24, 2018

(65) Prior Publication Data

US 2019/0360226 A1 Nov. 28, 2019

(51) Int. Cl.
*E04H 4/12* (2006.01)
*E03B 7/07* (2006.01)
*C02F 103/42* (2006.01)

(52) U.S. Cl.
CPC ........ *E04H 4/1245* (2013.01); *C02F 2103/42* (2013.01); *E03B 7/074* (2013.01); *E04H 4/1281* (2013.01)

(58) Field of Classification Search
CPC . E04H 4/1245; E04H 4/1281; C02F 2103/42; E03B 7/074
USPC .............. 210/167.11, 167.16, 167.17; 15/1.7
See application file for complete search history.

(56) References Cited

U.S. PATENT DOCUMENTS

| 5,660,802 | A | 8/1997 | Archer et al. |
| 5,810,999 | A | 9/1998 | Bachand et al. |
| 5,882,512 | A | 3/1999 | Denkewicz, Jr. et al. |
| 5,976,385 | A | 11/1999 | King |
| 7,736,523 | B2 | 6/2010 | King |
| 2006/0053572 | A1* | 3/2006 | Porat ..................... C02F 1/4674 15/1.7 |
| 2008/0237103 | A1* | 10/2008 | King ..................... E04H 4/1654 210/167.11 |
| 2009/0282627 | A1* | 11/2009 | Porat ..................... E04H 4/1281 15/1.7 |
| 2011/0139727 | A1* | 6/2011 | Hui ........................ C02F 1/688 210/749 |

(Continued)

OTHER PUBLICATIONS

US 9,750,836, 09/2017, Stokes et al. (withdrawn)

*Primary Examiner* — Fred Prince
(74) *Attorney, Agent, or Firm* — Pearl Cohen Zedek Latzer Baratz LLP (57) ABSTRACT

A pool cleaner includes a liquid inlet and a liquid outlet, a propulsion system, and a suction system including a motorized pump for drawing liquid through the inlet and expelling it through the outlet. A filter located between the inlet and the pump is configured to trap debris. A sanitization chamber that includes a chamber inlet and a chamber outlet is integrated into the housing such that the chamber inlet is located downstream of the pump and is configured to divert a fraction of the liquid that is outflowing from the pump into the chamber inlet, the remaining outflowing liquid flowing out through the liquid outlet. The sanitization chamber is configured to sanitize the liquid that is flowing through the sanitization chamber and to retard a flow rate of the liquid that is flowing through the sanitization chamber relative to a flow rate of the remaining outflow liquid.

11 Claims, 3 Drawing Sheets

(56) References Cited

U.S. PATENT DOCUMENTS

2012/0189491 A2   7/2012  Porat
2014/0166045 A1 * 6/2014  Herring ................ E04H 4/1654
                                              134/1

* cited by examiner

SANITIZATION CHAMBER FOR A POOL CLEANER

FIELD OF THE INVENTION

The present invention relates to pool cleaners. More particularly, the present invention relates to a sanitization chamber for a pool cleaner.

BACKGROUND OF THE INVENTION

Swimming pools need frequent cleaning and maintenance. The cleaning process involves removing dirt and debris that settle onto the floor and walls of the pool, as well as removal of floating debris. Manual and powered pool cleaning equipment of various types may be used to remove dirt and debris from the floors. Pool cleaners may utilize various types of mechanisms for removing debris from floors and walls of swimming pools, such as abrasion (e.g., by a rotating brush), suction, and pressure. A pool cleaner may be robotic or autonomous, with a propulsion system for moving the cleaner along pool surfaces.

In order to ensure the health of people who use the pool, maintenance of a swimming pool also requires preventing or limiting the growth of bacteria and other microscopic organisms. For example, water from the pool may be pumped through a water sanitization system wherein the water may be subjected to one or more agents for inhibiting growth of microorganisms. Such agents include one or more of various chemicals or materials (such as chlorine, ozone, hydrogen peroxide, or other materials), radiation (e.g., ultraviolet radiation), ultrasound, or other agents. In some cases, a pool cleaner may be additionally equipped to perform sanitization.

SUMMARY OF THE INVENTION

There is thus provided, in accordance with an embodiment of the present invention, a pool cleaner including: a housing, including at least one liquid inlet and at least one liquid outlet; a propulsion system for propelling the pool cleaner over a submerged surface of a pool; a suction system including a motorized pump, the suction system being configured to draw liquid from the pool through the at least one liquid inlet, and to expel the liquid back into the pool through the at least one liquid outlet; a filter located between the at least one liquid inlet and the pump and configured to trap debris in the drawn liquid; and a sanitization chamber including at least one chamber inlet and at least one chamber outlet, the sanitization chamber being integrated into the housing such that the at least one chamber inlet is located downstream of the pump and configured to divert a fraction of the liquid that is outflowing from the pump into the at least one chamber inlet to flow through the sanitization chamber to the at least one chamber outlet, the remaining outflowing liquid flowing out of the housing through the at least one liquid outlet, the sanitization chamber configured to sanitize the liquid that is flowing through the sanitization chamber and to retard a flow rate of the liquid that is flowing through the sanitization chamber relative to a flow rate of the remaining outflow liquid.

Furthermore, in accordance with an embodiment of the present invention, the at least one chamber inlet is located at a conduit from the pump to the at least one liquid outlet.

Furthermore, in accordance with an embodiment of the present invention, the conduit has a substantially circular cross section and the at least one chamber inlet has a shape of a sector of an annulus, an outer wall of the sector being formed by a wall of the conduit.

Furthermore, in accordance with an embodiment of the present invention, a cross sectional area of said at least one chamber inlet is configured such that the diverted fraction is between 5% and 20%.

Furthermore, in accordance with an embodiment of the present invention, the at least one chamber outlet opens directly from an interior of the sanitization chamber to an exterior of the housing.

Furthermore, in accordance with an embodiment of the present invention, the sanitization chamber is at least partially enclosed by the housing.

Furthermore, in accordance with an embodiment of the present invention, a part of the sanitization chamber that extends outside of the housing includes the at least one chamber outlet.

Furthermore, in accordance with an embodiment of the present invention, part of a grating that covers the at least one liquid outlet is configured to divert the fraction of the liquid that flows outward through the at least one liquid outlet into the at least one chamber inlet.

Furthermore, in accordance with an embodiment of the present invention, the at least one chamber outlet includes a plurality of outlet ports.

There is further provided, in accordance with an embodiment of the present invention, a pool cleaner including: a housing, including at least one liquid inlet and at least one liquid outlet; a propulsion system for propelling the pool cleaner over a submerged surface of a pool; a suction system including a motorized pump, the suction system being configured to draw liquid from the pool through the at least one liquid inlet, and to expel the liquid back into the pool through the at least one liquid outlet; a filter configured to trap debris in the drawn liquid; and a sanitization chamber including at least one chamber inlet and at least one chamber outlet, the sanitization chamber being located downstream of the filter and upstream of the pump, the at least one chamber inlet configured to divert a fraction of the liquid flowing from the filter and toward the pump through the sanitization chamber and out through the at least one chamber outlet while the remainder of the liquid bypasses the chamber to the pump, the sanitization chamber configured to sanitize the liquid that is flowing through the sanitization chamber and to retard a flow rate of the liquid that is flowing through the sanitization chamber relative to a flow rate of the remainder of the liquid.

Furthermore, in accordance with an embodiment of the present invention, the at least one chamber inlet is located adjacent to a downstream side of the filter, an area of the at least one chamber inlet covering a fraction of an area of the filter.

Furthermore, in accordance with an embodiment of the present invention, the fraction of an area is less than 50%.

Furthermore, in accordance with an embodiment of the present invention, the sanitization chamber is enclosed within the housing.

Furthermore, in accordance with an embodiment of the present invention, the at least one chamber outlet is upstream of the pump.

Furthermore, in accordance with an embodiment of the present invention, the at least one chamber outlet includes a plurality of outlet ports.

There is further provided, in accordance with an embodiment of the present invention, a pool cleaner including: a housing, including at least one liquid inlet and a liquid outlet; a propulsion system for propelling the pool cleaner over a submerged surface of a pool; a suction system including a motorized pump, the suction system being configured to draw liquid from the pool through the at least one liquid inlet, and to expel the liquid back into the pool through the at least one liquid outlet; a filter configured to trap debris in the drawn liquid; a conduit to guide the liquid to flow from the pump to the liquid outlet, a wall of the conduit including one or a plurality of openings; and a sanitization chamber at least partially surrounding the conduit, the sanitization chamber including at least one interior port that is open to an interior of the housing such that a fraction of the liquid that is flowing from the at least one liquid inlet toward the at least one liquid outlet is diverted to flow through the chamber while a remainder of the liquid bypasses the sanitization chamber to flow directly to the at least one liquid outlet, an interior of the sanitization chamber being open to the conduit via the one or a plurality of openings to enable a flow of the liquid through the sanitization chamber between the one or a plurality of openings and the at least one interior port, the sanitization chamber configured to sanitize the liquid that is flowing through the sanitization chamber and to retard a flow rate of the liquid that is flowing through the sanitization chamber relative to a flow rate of the remainder of the liquid.

Furthermore, in accordance with an embodiment of the present invention, the at least one interior port is located upstream of the pump.

Furthermore, in accordance with an embodiment of the present invention, the plurality of openings are located downstream from the pump.

Furthermore, in accordance with an embodiment of the present invention, the at least one chamber inlet is located downstream from the filter.

Furthermore, in accordance with an embodiment of the present invention, outer walls of the sanitization chamber substantially form a rectangular box.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

In accordance with an embodiment of the present invention, an electrically-powered pool cleaner includes a debris filter that is mounted on or within a housing of the pool cleaner. A pump or other suction mechanism is configured to draw liquid from the pool (e.g., water or another liquid) into the pool cleaner through an inlet. The inlet is typically located on or near a bottom of the cleaner housing. As used herein, the bottom of the pool cleaner refers to a side of surface of the pool cleaner that faces the surface being cleaned, e.g., a floor or wall of the pool. A top or upper side of the pool cleaner refers to a side or surface that faces away from the surface to be cleaned.

The liquid that is drawn through the inlet into the pool cleaner may include suspended dirt or debris. The liquid that is drawn into the pool cleaner may be drawn by the pump through the filter. The filter is configured to allow the liquid to pass while trapping the suspended debris. The filtered liquid is then forced out of an outlet to the pool.

For example, the pump may include a propeller or impeller, or another mechanism for causing a liquid to flow from the inlet to the outlet. Typically, the filter covers a flow path between the inlet and the pump. The filter may be configured to trap at least part of the debris that is suspended in the liquid (e.g., dirt, particles, or larger pieces of debris) within the housing (e.g., within a box, bag, drawer, compartment, or other structure that is enclosed by the housing) for later removal and disposal.

The pool cleaner includes a propulsion mechanism for propelling the pool cleaner over surfaces (e.g., floor and walls) of the pool. The propulsion mechanism for propelling the pool cleaner may include an electric motor driving wheels or tracks that support the cleaner and are capable of transporting the pool cleaner along a surface. Alternatively or in addition, the propulsion mechanism may operate by jet propulsion by directing a jet or flow of liquid, e.g., efflux from the pump, in a direction opposite to a desired direction of motion of the pool cleaner. Other propulsion mechanisms may be used.

Power, typically electrical power, for operating the suction and propulsion mechanisms may be provided internally (e.g., by a storage battery that is housed by the cleaner housing). Alternatively or in addition, electrical power may be provided from an external power supply that is connected to the pool cleaner by a cable. For example, the external power supply may include a generator or may be connectable to a line voltage. The external power supply may be configured to convert the power to a form (e.g., low voltage direct current, e.g., similar to power that may be provided by a typical storage battery) that is suitable for operation of a submerged pool cleaner.

The pool cleaner includes a sanitization chamber into which a nonzero fraction of the liquid that flows between inlet and outlet is diverted. As used herein, a first quantity is referred to as a fraction or nonzero fraction of a second quantity when the first quantity is significantly (e.g., as by having a perceptible or measurable effect) greater than zero and significantly less than (e.g., as by having a perceptibly or measurably different effect from) the second quantity. The sanitization chamber is configured to retard the rate of flow of the liquid that flows through the chamber, e.g., relative to the rate of flow of liquid in efflux from the pump or through an intake to the pump. The sanitization chamber may include one or more devices or units that are configured to sanitize the liquid that flows through the chamber at the retarded flow rate.

For example, the sanitization chamber may include one or more dispensers or generators of a chemical sanitization agent (e.g., chlorine dispenser, hydrogen peroxide generator, ozone generator, or a dispenser or generator of another chemical germicidal or other sanitizing agent). A sanitization chamber that is configured to dispense a substance may be configured to enable access by a user of the pool cleaner. For example, the sanitization chamber may include a refillable container, canister, or receptacle, or may be configured to hold a replaceable cartridge or canister, for holding a sanitizing substance (e.g., in the form of tablets, pellets, powder, or another form), or a material from which a sanitizing substance may be generated (e.g., by combining two or more such materials, by exposing one or more such materials to energy, or otherwise). In this case, the sanitization chamber may be provided with one or more doors or openings to enable access by the user in order to refill or replace a container of such a substance or material. Alternatively or in combination, the chamber may be configured to introduce a flocculating agent into the liquid, e.g., to enable filtering or other removal of one or more suspended impurities from the pool water.

As another example, the sanitization chamber may include one or more sources of sanitizing energy. Such energy sources may include radiation sources (e.g., light emitting diodes or other sources of germicidal ultraviolet C radiation or another type of sanitizing radiation), ultrasound sources (e.g., transducers), or other sources of energy for sanitizing the liquid. In some cases, interior walls of the sanitization chamber may be configured to facilitate distribution of the sanitizing energy throughout the enclosed volume of the sanitization chamber.

At least the interior surfaces of the sanitization chamber may be configured (e.g., coated or constructed) to be resistant to degradation of the surfaces by exposure to any sanitizing substances or radiation.

In some cases, a sanitization chamber may include one or more sensors of one or more types. The sensors may be configured to monitor one or more properties of liquid that flows through the sanitization chamber. For example, such a sensor may include an amperometric sensor, temperature sensor, oxidation reduction potential sensor, pH sensor, flowmeter, optical density sensor, or other sensor for measuring one or more physical or chemical properties of liquid flowing through the sanitization chamber. One or more sensors may be configured to measure a remaining amount of a sanitizing substance, intensity of sanitizing energy, or other quantity related to function of the sanitization chamber. In some cases, a controller of the pool cleaner (e.g., located within the pool cleaner, e.g., near a propulsion motor of the pool cleaner or elsewhere internally, or located externally to the pool cleaner, e.g., on or near an external power supply that is connected by cable to the pool cleaner, or elsewhere externally) may be configured to control one or more sanitization agents (e.g., dispensing of a substance or generation of energy), or to issue an alert to an operator of the pool cleaner, based on one or more sensed values.

In the case where a substance dispenser, energy source, or sensor requires electrical power in order to operate, the electrical power may be provided by the same power sources that provide power for operation of the suction and propulsion systems (e.g., by an electrical cable that connects to the devices), or by a separate power source (e.g., by a storage or replaceable battery that is contained within the sanitization chamber). For example, an electric cable may extend from the interior of the chamber, through a watertight gland, to a control circuit of the pool cleaner. For example, the pool cleaner controller may be located within an enclosure of the propulsion assembly that includes the motor. The cable may be configured to carry electrical power, control signals (e.g., from the controller to controlled components), monitoring signals (e.g., from one or more sensors), or other electrical, optic, or other signals or power.

In one example of a pool cleaner, the sanitization chamber may be integrated into the housing of the pool cleaner. As used herein, a sanitization chamber may be referred to as integrated into the housing if the chamber is manufactured or provided as part of the housing (e.g., of a component of the housing), or if the sanitization chamber is attached to the housing (e.g., being provided as a separate component that is attachable to the housing using latches, screws, bolts, or otherwise).

In this example, a chamber inlet to the sanitization chamber may be located at (e.g., within, adjacent to from outside of, or otherwise close to) an outlet conduit leading to the outlet of the pool cleaner. For example, an area (e.g., cross sectional area) of the chamber inlet may cover a fraction between zero and one of the area (e.g., cross sectional area) of the outlet conduit or of the outlet itself. The chamber inlet may thus be configured to divert a similar fraction (typically between 5% and 20%, e.g., 15% to 18%, or another range of fractions) of the liquid that is flowing toward the outlet into the sanitization chamber.

In this case, all or part of the sanitization chamber may be located within the cleaner housing. In some cases, most of the sanitization chamber, except for the entrance to the chamber inlet (e.g., in the form of a duct) may be located outside of the cleaner housing.

A flow rate (e.g., as expressed or measured as a velocity of a small volume of the flowing liquid, as a mass or volume that passes a surface per unit area per time, or otherwise) of the liquid that enters the sanitization chamber may be slower than the rate of flow of the liquid that flows directly outward through the cleaner outlet. For example, a volume of the sanitization chamber may be sufficiently large so that the flow rate of the liquid in the sanitization chamber is retarded relative to the flow through the cleaner outlet. In some cases, the interior of the sanitization chamber may include baffles, ducts or conduits, or other internal structure to slow the rate of flow of the liquid. Internal baffles may serve to impart a swirling or turbulent motion to liquid flowing through the sanitization chamber, e.g., to facilitate exposure to a sanitizing substance or energy. In some cases, a baffle may protect an operator of the pool cleaner, or a bystander, from direct exposure to sanitizing energy (e.g., to an ultraviolet radiation source).

Some or all of the walls of the sanitization chamber may be flat, or concavely or convexly curved. The walls may be shaped so as to conform to the shape of a part of the cleaner housing, or of other components of the pool cleaner, that neighbor, are adjacent to, that partially or completely surround, are partially or completely surrounded by, or that are otherwise near the sanitization chamber.

In some cases, the sanitization chamber may be elongated. An elongated sanitization chamber may be formed in a spiral shape, e.g., with a cross sectional area that varies (e.g., monotonically increases or decreases) from the chamber inlet to the chamber outlet. For example, such a spiral shape or similar shape may enable increasing the duration the time that a volume of liquid remains within the chamber, controlling the rate of flow through the chamber, or otherwise facilitate a sanitizing function of the chamber.

The sanitization chamber may be configured to facilitate removal from the cleaner housing for cleaning, maintenance, replacement, refilling, or when it is desired to operate the swimming pool cleaner without sanitizing the liquid in the pool. In some cases, a sanitization chamber may also be configured to be retrofitted onto an existing swimming pool cleaner.

The liquid that is diverted to flow through the sanitization chamber may be exposed to one or more sanitization agents. For example, a germicidal material (e.g., chlorine, hydrogen peroxide, ozone, or another material) may be added to the liquid in the sanitization chamber. The sanitization chamber may include one or more sources of ultraviolet (e.g., ultraviolet C radiation) or other germicidal radiation, an ultrasound generator, or another type of energy suitable for sanitizing the liquid. The reduced rate of flow of the liquid through the sanitization chamber may enable the sanitization agent to effectively sanitize the liquid in the chamber. When the sanitization chamber is configured to enable sanitization by exposing the liquid to sanitizing energy, the interior walls of the sanitization chamber may be configured (e.g., coated or textured) to facilitate reflection or diffusion of the energy throughout the volume of liquid in the chamber.

A chamber outlet may be configured such that the sanitized liquid flows out of the sanitization chamber and directly into the pool.

In another example of a pool cleaner, a chamber inlet to the sanitization chamber may be attached to or positioned adjacent to a downstream side of the filter, e.g., between the filter and the pump. The area of the chamber inlet may less than 50%, or another fraction, of the area of the filter, such that the chamber inlet only partially covers the downstream side of the filter. Thus, part of the liquid flowing downstream of the filter may be directed into the sanitization chamber, while the remainder may flow (e.g., via the pump) to the cleaner outlet.

In another example, a chamber inlet to the sanitization chamber may be located upstream of the pump and the filter, e.g., between the cleaner inlet and the filter. The chamber outlet may be located upstream of the filter, such that the liquid that flows out of the chamber is filtered by the filter of the pool cleaner. Alternatively, the chamber outlet may be downstream of the filter. In this case, the chamber, its inlet, or its outlet may be provided with a separate filter or trap.

In another example, the pool cleaner includes a conduit that is interior to the housing and that is configured to convey a flow of the liquid from the pump to the cleaner outlet. The sanitization chamber at least partially surrounds the conduit. An opening or a plurality of openings or perforations in the wall of the conduit enable fluid flow from the interior of the sanitization chamber into the interior of the conduit. One or more chamber inlets to the sanitization chamber are located downstream from the filter and upstream from the pump. The suction of the pump may draw some of the liquid that flows downstream from the filter through the chamber inlets, via the sanitization chamber, and through the openings into the conduit. The remaining liquid that flows downstream from the filter may be drawn directly into the conduit. The liquid that is drawn into the conduit, whether directly or via the sanitization chamber, may be drawn to the pump and expelled into the pool via the cleaner outlet.

One or more of the sanitization chamber inlet or outlet ports may be located on a lateral face or wall of the chamber, on an upper face of the chamber (e.g., facing a side of the pool cleaner toward which liquid is ejected from the pool cleaner via the cleaner outlet), on a lower face of the chamber (e.g., facing a side of the pool cleaner through which liquid from the pool is drawn inward via the cleaner inlet), or in another direction. A chamber inlet or outlet port may be in the form of one or more of an opening in a wall of the chamber, a tube extending distally from exterior walls of the chamber or proximally into the chamber, or any combination thereof.

An inlet or outlet port may be circular, oval, rectangular, elongated, or otherwise shaped, or a plurality of ports may include a combination of different shapes.

A chamber inlet into a sanitization chamber, an outlet from the chamber, or both, regardless of location (e.g., upstream of the pump, downstream from the pump, adjacent to a downstream side of a filter, between the filter and the pump, or elsewhere) may have an adjustable area. In some cases, the chamber inlet or outlet may be provided with an adjustable valve. The adjustable valve may enable adjusting the area of the chamber inlet or outlet, e.g., to any area ranging from completely open to completely closed, or may be limited to a smaller range of areas. For example, the valve may include a slidable or rotatable flap, door, or shutter that may be closed to reduce the area of the chamber inlet or outlet, or may be opened to enlarge the area of the chamber inlet or outlet. In some cases, the valve may be opened manually (e.g., by an operator moving a mechanical lever, e.g., when the pool cleaner is not operating and when one or more panels of the pool cleaner housing are opened to enable access). In other cases, the valve may be motorized to enable adjustment of the valve without physical access to the valve (e.g., from a control panel of the pool cleaner), or via a remote device or controller.

In some cases, the chamber inlet or outlet may include a plurality of separate ports, each of which may be fully opened or fully closed. For example, a port may be closed by closing a slidable shutter, by closing a flap (e.g., which may be clipped or held in an open or closed position), by insertion of a removable plug, or otherwise.

In some cases, the chamber inlet or outlet may be provided with a valve that may be (e.g., automatically) opened or closed intermittently. Thus, liquid may, at alternating time periods, be allowed to flow into the chamber and be made to bypass the chamber at other times. The valve may be driven by an electric solenoid, may include a rotary sleeve-type valve with a continuously rotating sleeve, or may otherwise act intermittently. The valve may be shaped such that the flow of liquid to the chamber is stopped gradually rather than abruptly. The rotary sleeve of a sleeve valve may be driven by a dedicated motor, or by a liquid turbine driven by efflux from the pump, by the propulsion motor via a pulley, gear train, or other transmission, or may be otherwise driven.

In some cases, an additional pump may be provided to cause liquid to flow through the sanitization chamber. The additional pump may be configured to, in some cases, draw liquid through the filter into the chamber, thus also contributing to the suction of the suction pump of the pool cleaner. In other cases, the additional pump may be configured to draw liquid from outside the pool cleaner housing. The additional pump may be driven by a dedicated motor. Alternatively, the additional pump may be driven by the propulsion motor of the pool cleaner. In this case, the additional pump, e.g., a centrifugal pump where the direction of flow is independent of the rotational direction of the impeller, may be fixed directly to an output shaft of the drive motor, or may be driven indirectly, e.g., via a pulley, gear train, or other transmission.

In some cases, the entire sanitization chamber may be rotatable at a controlled speed so as to force liquid through the chamber inlet and into the chamber. For example, the chamber may be rotated by a motor driving a ring gear at the base of the chamber, by a liquid turbine arrangement that is driven by efflux from the suction pump of the pool cleaner, may be driven by the propulsion motor via a pulley or other transmission, or may be otherwise rotated.

A pool cleaner with a sanitization chamber, as described herein, may be advantageous over other types of systems. For example, incorporating the sanitization chamber into a robotic pool cleaner, rather than maintaining separate cleaning and sanitization systems, may simplify and reduce the cost of pool maintenance. Incorporating a sanitization chamber into which part of the filtered flow is diverted may enable, on the one hand, filtering all of the liquid that flows through the cleaner, while sanitizing only a desired fraction of the fluid that is drawn into the pool cleaner (e.g., in the case of sanitization by introduction of a germicidal material, where the material may be expected to diffuse throughout the liquid in the pool from the liquid that was sanitized in the sanitization chamber). Configuring the sanitization chamber to reduce the rate of flow of liquid within the chamber may enable the pool cleaner system to use a single suction system for both filtering and sanitizing the liquid. Configuring the sanitization chamber such that an inflow to the chamber is impelled by the suction pump of the pool cleaner or by a separate pump, and not by motion of the pool cleaner through the liquid in the pool, may facilitate sanitization of the liquid in the pool at times when the pool cleaner is operation in the pool without moving (e.g., after completion of cleaning of interior or submerged surfaces of the pool).

Figure 1:
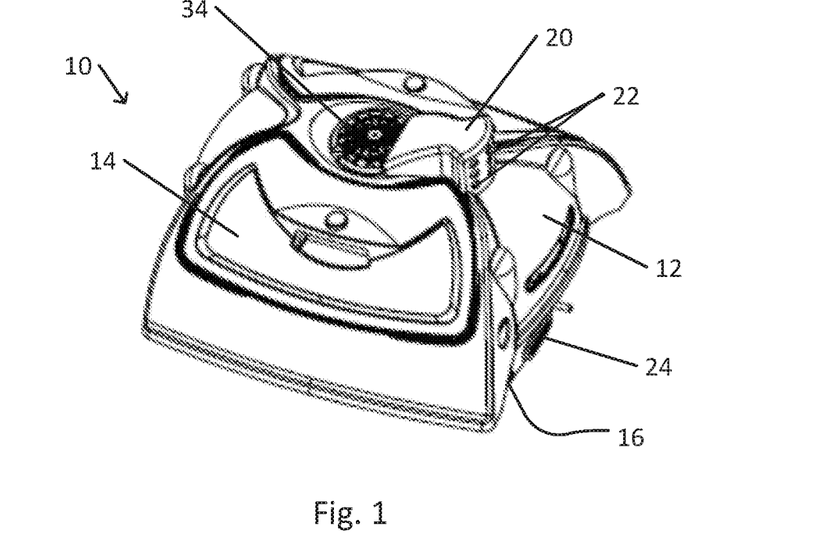
FIG. 1 schematically illustrates a pool cleaner that includes a sanitization chamber located at a liquid outlet from the pool cleaner.
Figure 2:
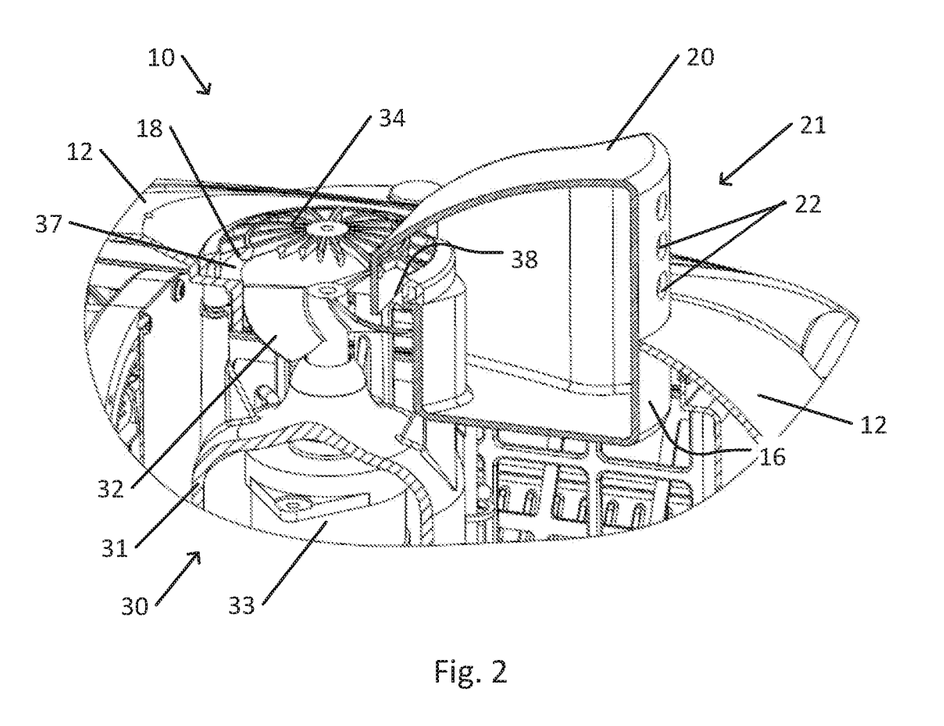
FIG. 2 is a schematic cutaway view of part of the pool cleaner and sanitization chamber shown in FIG. 1.

FIG. 1 schematically illustrates a pool cleaner that includes a sanitization chamber located at a liquid outlet from the pool cleaner. FIG. 2 is a schematic cutaway view of part of the pool cleaner and sanitization chamber shown in FIG. 1.

Pool cleaner 10 is configured to operate when submerged in a liquid that is held by a pool. Pool cleaner 10 includes components that are housed by cleaner housing 12. One or more interior enclosures or housings may be watertight or otherwise configured to prevent the liquid from wetting or infiltrating those components of pool cleaner 10 whose operation may be adversely affected by contact with the liquid.

Pump assembly 30 is configured to draw liquid into one or more interior conduits or cavities of pool cleaner 10 via cleaner inlet 16. For example, pump motor 33 of pump assembly 30 may be enclosed in motor casing 31. Motor casing 31 may be watertight to prevent pump motor 33 from coming into contact with liquid from the pool. Pump motor 33 is configured to operate pump impeller 32 to impel the indrawn liquid through the interior conduits of pool cleaner 10 to outflow conduit 37. For example, pump impeller 32 may be in the form of a propeller, as in the example shown, or may include a centrifugal or other mechanism for impelling the liquid. Pump impeller 32 may be located upstream of outflow conduit 37 or within outflow conduit 37.

In some cases, pump motor 33 may be identical with a motor for operating a propulsion system of pool cleaner 10. For example, one or more transmission assemblies may enable pump motor 33 to concurrently operate pump impeller 32 and propulsion mechanism 24. Propulsion mechanism 24 may include one or more wheels, tracks, propellers, fins, jets, or another type of motorized propulsion mechanism.

The interior conduits of pool cleaner 10 may be configured such that the liquid that is drawn into pool cleaner 10 passes through the filter. Debris that is suspended in the indrawn liquid and which is trapped by the filter may remain in one or more interior compartments of pool cleaner 10. At least part of the filtered liquid may be expelled into the pool via outflow conduit 37 and cleaner outlet 18. Cleaner outlet 18 may be covered by outlet grating 34. For example, outlet grating 34 may be configured to prevent contact between fingers or other objects and moving parts within pool cleaner 10 (e.g., impeller 18 or other moving internal components of pool cleaner 10).

Cleaner housing 12 may include one or more access panels 14. An access panel 14 may be hinged, removable, or otherwise capable of being opened to enable access to interior components of pool cleaner 10 that are housed within cleaner housing 12. In particular, access panel 14 may be opened to enable access to an interior compartment of pool cleaner 10 to enable removal of debris that was trapped by a filter of pool cleaner 10.

Sanitization chamber 20 is mounted to cleaner housing 12 of pool cleaner 10. In the example shown, sanitization chamber 20 is located partly within cleaner housing 12. In the example shown, a part of sanitization chamber 20 that includes chamber outlet 21 extends outward from cleaner housing 12. In the example shown, chamber outlet 21 opens directly from the interior of sanitization chamber 20 to the exterior of cleaner housing 12, e.g., directly into a pool in which pool cleaner 10 is submerged.

In the example shown, chamber outlet 21 includes a plurality of chamber outlet ports 22. In other examples, chamber outlet 21 may include a single opening, a single opening covered by a mesh or grating, an opening covered by a porous material, or may be otherwise configured.

Alternatively, all of sanitization chamber 20 may be located outside of (e.g., mounted to an outer surface of) cleaner housing 12. Alternatively, all of sanitization chamber 20 may be enclosed within cleaner housing 12, e.g., with chamber outlet ports 22 aligned with an opening or window in cleaner housing 12, opening to a conduit that extends from within cleaner housing 12 to the exterior of cleaner housing 12, or otherwise enabling outflow of sanitized liquid from sanitization chamber 20 into the pool. In the example shown, chamber outlet ports 22 are shown as circular. In other examples, some or all of chamber outlet ports 22 may be elongated, slot-like, rectangular, elliptical, or otherwise shaped.

Chamber inlet 38 is configured to divert a nonzero fraction of liquid that is flowing through outflow conduit 37 into sanitization chamber 20. For example, chamber inlet 38 may cover a nonzero fraction (less than one) of the cross-sectional area of outflow conduit 37. In the example shown, where outflow conduit 37 has a circular cross section, chamber inlet 38 may have a general form of a sector of an annulus, with the outer wall of the sector-shaped chamber inlet 38 being formed by a wall of outflow conduit 37. Chamber inlet 38 may have another form. Alternatively or in addition, vanes or ribs of outlet grating 38, e.g., those that are located adjacent to chamber inlet 38, may be oriented so as divert part of the outflowing liquid into chamber inlet 38.

Thus, a fraction (e.g., similar, proportional to, or dependent on the fraction of area of outflow conduit 37 that is covered by chamber inlet 38) of the liquid that is flowing outward through outflow conduit 37 may be diverted by chamber inlet 38 to flow into sanitization chamber 20. The remainder of the liquid that is flowing through outflow conduit 37 may flow directly out of pool cleaner 10 via cleaner outlet 18. For example, a fraction of outflow conduit 37 that is covered by chamber inlet 38 may be configured to divert between 5% and 20%, e.g., 15% to 18%, or another fraction, of the liquid that is flowing through outflow conduit 37 into chamber inlet 38.

The volume of sanitization chamber 20 may be sufficiently large such that a rate of flow of liquid that flows through sanitization chamber 20 between chamber inlet 38 and chamber outlet ports 22 may be slower than a rate of flow outward through cleaner outlet 18 that bypasses sanitization chamber 20. In some cases, the sizes, shapes, and locations of chamber inlet 38 and of chamber outlet ports 22 may be configured to achieve a desired retarded flow rate through sanitization chamber 20. Sanitization chamber 20 may include other structure that is configured to retard a rate of flow of liquid through sanitization chamber 20. For example, in some cases, sanitization chamber 20 may include internal baffles, ducts, or other structures to increase the flow path, and thus decrease the rate of flow of liquid through sanitization chamber 20. Other structure of pool cleaner 10 may be configured to enable or adjust the retarded flow rate through sanitization chamber 20. For example, outlet grating 34 or pump assembly 30 may include structure to direct or adjust flow into and through sanitization chamber 20.

The reduced rate of flow of liquid through sanitization chamber 20 may enable effective sanitization or other treatment of the liquid within sanitization chamber 20.

For example, sanitization chamber 20 may be configured to dispense a substance that is configured to dissolve or diffuse within the liquid that flows through sanitization chamber 20. The flow rate of the liquid through sanitization chamber 20 may be sufficiently slow that the substance may diffuse throughout the liquid in sanitization chamber 20 before the liquid exits sanitization chamber 20 via chamber outlet ports 22. For example, a substance in solid form (e.g., pellets, powder, block, tablet, amorphous mass, or other form of solid) may be held in an appropriate holder within sanitization chamber 20. A suitable holder for a solid substance may include a chamber, cage, canister, container, or other enclosure that is perforated, porous, or otherwise open to liquid flow. A suitable holder for a substance in liquid form may include a porous bag or enclosure. A dispensed substance may have germicidal, algicidal, decontamination, or other sanitization or treatment properties or capabilities.

As another example, sanitization chamber 20 may include, or may be exposed to, one or more sources of energy that may serve to sanitize a liquid in sanitization chamber 20. Such energy sources may include sources of ultraviolet (e.g., ultraviolet C) or other electromagnetic radiation, sources of ultrasound or of other types of vibrations, heaters, or other types of treatment energy sources. A flow of liquid through sanitization chamber 20 may be sufficiently slow so as to enable effective exposure of the liquid to the generated energy.

In some cases, sanitization chamber 20 may be located in a liquid flow path within the pool cleaner between a filter and pump assembly 30 of the pool cleaner.

Figure 3A:
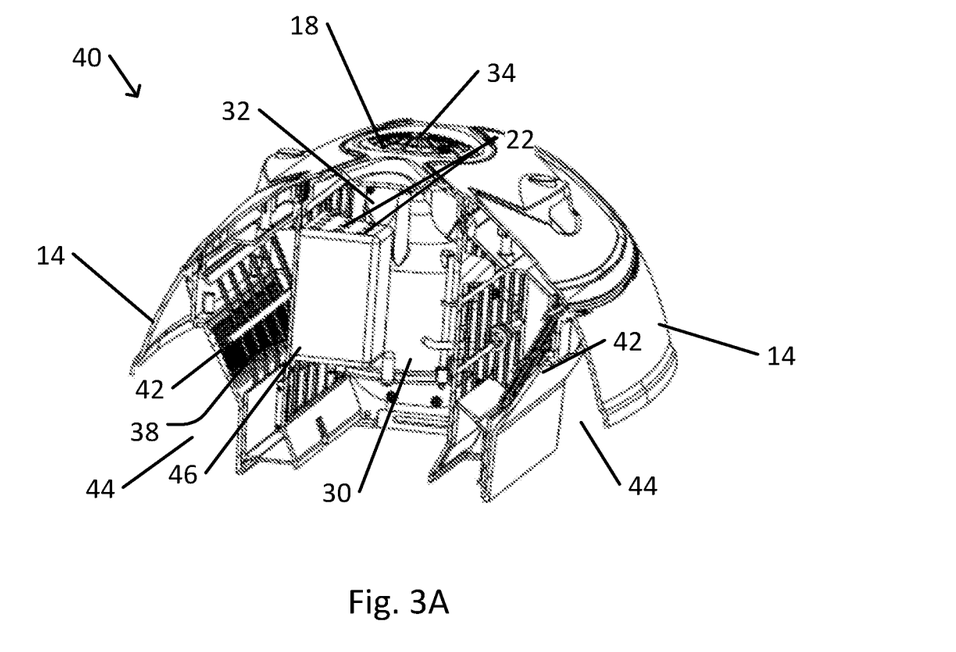
FIG. 3A schematically illustrates internal components of a pool cleaner that includes a sanitization chamber located adjacent to a filter.
Figure 3B:
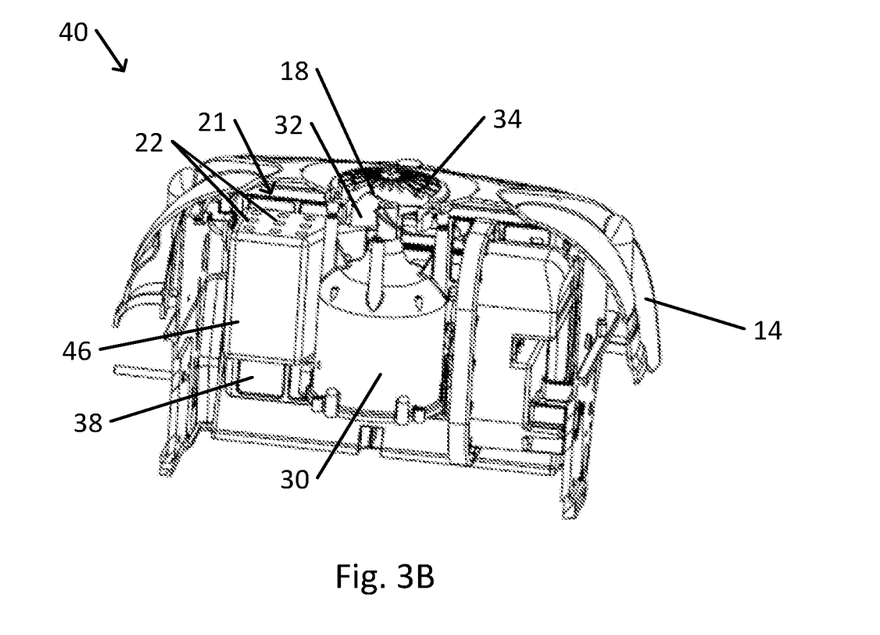
FIG. 3B is a schematic view of the sanitization chamber of the pool cleaner shown in FIG. 3A.

FIG. 3A schematically illustrates internal components of a pool cleaner that includes a sanitization chamber located adjacent to a filter. FIG. 3B is a schematic view of the sanitization chamber of the pool cleaner shown in FIG. 3A.

In pool cleaner 40, liquid that is drawn into pool cleaner 40 by pump impeller 32 of pump assembly 30 is caused to flow via one or more filters 42. Debris that is suspended in the flowing liquid may trapped by each filter 42. The trapped debris may remain in chambers 44, e.g., until removed via access panels 14.

Sanitization chamber 46 is located downstream from filter 42 and upstream of pump impeller 32 of pump assembly 30. Chamber outlet 21, including outlet ports 22 in the example shown, of sanitization chamber 46 is located downstream of chamber inlet 38 and upstream of pump impeller 32. Thus, pumping action of pump impeller 32 may draw liquid that has passed through filter 42 into sanitization chamber 46 via chamber inlet 38, and out through chamber outlet ports 22. The liquid that exits sanitization chamber 46 via chamber outlet ports 22 may be impelled by pump impeller 32 to flow outward from cleaner housing 12 of pool cleaner 40 via cleaner outlet 18.

Chamber inlet 38 of sanitization chamber 46 is placed adjacent to the downstream side of a filter 42. The area of chamber inlet 38 may cover a nonzero fraction of the area of the adjacent filter 42 (e.g., less than 50%, or another fraction). Thus, part of the liquid fluid that flows downstream of filter 42 may be diverted to flow into sanitization chamber 46. A nonzero remainder of the liquid that flows through filter 42 (as well as the liquid that flows through any other filter 42 whose downstream side is not adjacent to chamber inlet 38) may flow unimpeded or directly toward pump impeller 32 of pump assembly 30 and out through cleaner outlet 18.

The structure or volume of sanitization chamber 46 may be configured such that a rate of flow of liquid that flows through sanitization chamber 46 between chamber inlet 38 and chamber outlet ports 22 may be much slower than a rate of flow of liquid directly from filter 42 to cleaner outlet 18, bypassing sanitization chamber 46. The reduced rate of flow may enable effective sanitization or other treatment of the liquid within sanitization chamber 46. For example, sanitization chamber 46 may include structure for introducing a sanitizing substance into liquid that flows through sanitization chamber 46. Alternatively or in addition, sanitization chamber 46 may include structure or components for exposing the liquid that flows through sanitization chamber 46 to sanitizing energy.

In some cases, a sanitization chamber may be configured such that a reduced flow through the sanitization chamber is parallel to a direct flow toward cleaner outlet 18. For example, pump impeller 32 of pump assembly 30 may be located in a conduit that leads to cleaner outlet 18, and a sanitization chamber through which liquid flows in parallel to the liquid in the conduit may adjoin the conduit.

Figure 4A:
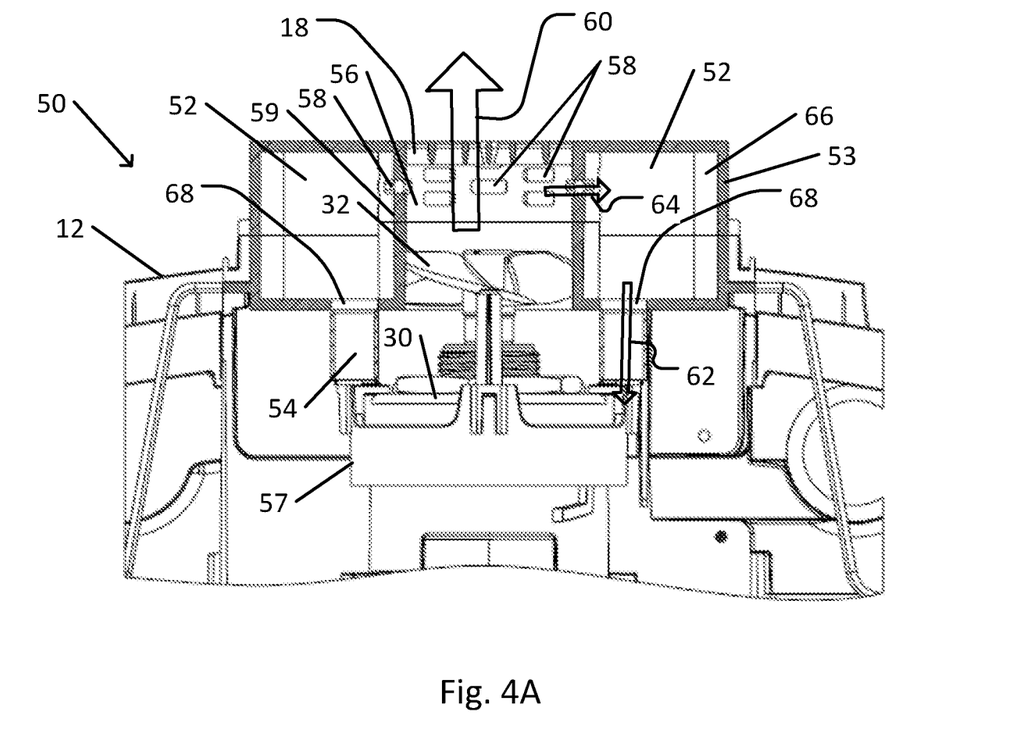
FIG. 4A is a schematic cross section of a part of a pool cleaner with a sanitization chamber that is adjacent to an outlet conduit of the pool cleaner.
Figure 4B:
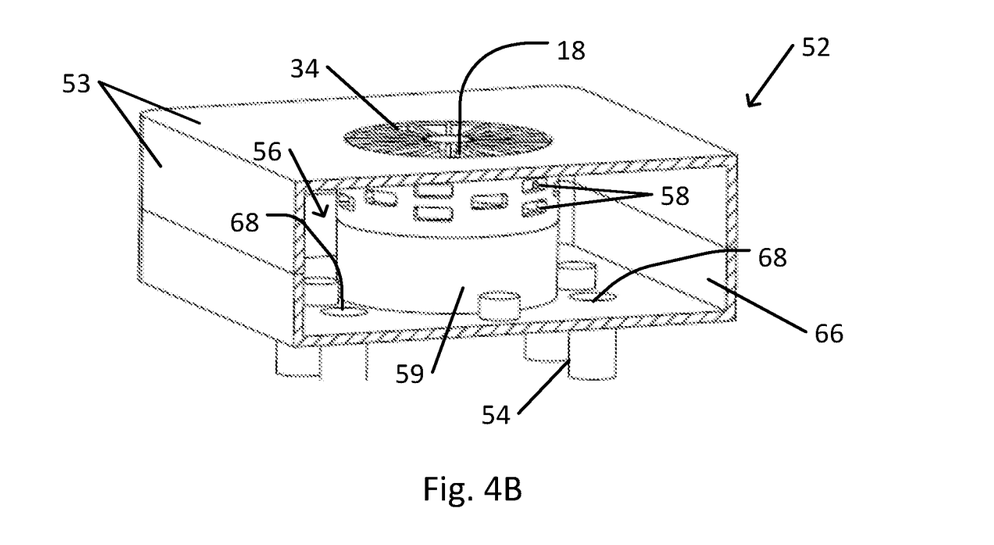
FIG. 4B is a schematic perspective view of the sanitization chamber and conduit shown in FIG. 4A.

FIG. 4A is a schematic cross section of a part of a pool cleaner with a sanitization chamber that is adjacent to an outlet conduit of the pool cleaner. FIG. 4B is a schematic perspective view of the sanitization chamber and conduit shown in FIG. 4A.

Pool cleaner 50 includes a sanitization chamber 52 that is surrounded by outer walls 53, and that at least partially surrounds conduit wall 59 of outlet conduit 56.

In pool cleaner 50, interior conduit 57 may direct a liquid flow that has been drawn into interior conduit 57 via cleaner inlet 16 and filter 42 (as shown in FIGS. 1 and 3A) toward pump impeller 32. Liquid that flows through pump impeller 32 may be expelled from pool cleaner 50 back into the pool via outlet conduit 56 and cleaner outlet 18, as indicated by conduit outflow arrow 60.

In the example shown, outer walls 53 of sanitization chamber 52 are in the form of a rectangular box. Alternatively, the outer walls may form a circular or oval cylinder, may have a nonrectangular polygonal cross section, or may be surrounded by a combination of various flat and curved (e.g., concave or convex) forms.

Conduit wall 59 that surrounds outlet conduit 56 may form an inner wall of sanitization chamber 52. In the example shown, sanitization chamber 52 surrounds all sides of outlet conduit 56. In other examples, a sanitization chamber may surround part of the perimeter of outlet conduit 56.

Conduit wall 59 includes one or more conduit wall openings 58. Conduit wall openings 58 may enable a liquid flow between the interior of sanitization chamber 52 and the interior of outlet conduit 56. The direction of the flow between sanitization chamber 52 and outlet conduit 56 (e.g., whether from outlet conduit 56 into sanitization chamber 52, or vice versa) may depend on pressures and their distribution within pool cleaner 50 and the positions of interior chamber ports 54 and conduit wall openings 58 relative to other components of pool cleaner 50. Alternatively or in addition to conduit wall openings 58, one or more outer walls 53 of sanitization chamber 52 may include openings directly to the exterior of pool cleaner 50 (e.g., directly into the pool).

One or more interior chamber ports 54 may open to the interior of sanitization chamber 52 at interior port openings 68. In the example shown, interior chamber ports 54 are in the form of circular tube-like conduits whose proximal (to sanitization chamber 52) ends open at interior port openings 68. Distal ends of interior chamber ports 54 open to interior conduit 57 or elsewhere within the interior of cleaner housing 12 of pool cleaner 50. In other examples, interior chamber ports 54 may have another form (e.g., may be identical with interior port openings 68, may be longer or shorter, may have another shape, or may otherwise have another form).

In the example shown, where interior chamber ports 54 open to the interior of pool cleaner 50 upstream of pump impeller 32, a suction that is applied by pump impeller 32 may draw liquid outward from sanitization chamber 52 via interior port openings 68 and interior chamber ports 54, as indicated by chamber outflow arrow 62. The drawing of liquid out of sanitization chamber 52 may cause an inflow of liquid from outlet conduit 56 into sanitization chamber 52 via conduit wall openings 58, as indicated by chamber inflow arrow 64.

In other examples, e.g., when pump impeller 32 is located upstream of interior chamber ports 54, when distal ends of interior chamber ports 54 open to an interior point far upstream of pump impeller 32, or in other variants of pool cleaner 50, the flow through sanitization chamber 52 may be opposite to the flow described above (e.g., inflow through interior chamber ports 54 and interior port openings 68, and outflow into outlet conduit 56 through conduit wall openings 58).

The structure or volume of sanitization chamber 52 may be configured such that a rate of flow of liquid that flows through sanitization chamber 52 between conduit wall openings 58 and interior port openings 68 may be much slower than a rate of flow of liquid flowing outward directly from pump impeller 32 via outlet conduit 56 and cleaner outlet 18, and not entering sanitization chamber 52. The reduced rate of flow may enable effective sanitization or other treatment of the liquid within sanitization chamber 52.

Sanitization chamber 52 may include sanitization structure 66 for sanitizing liquid that flows through sanitization chamber 52. For example, sanitization structure 66 may be configured to introduce a sanitizing substance into the liquid that flows through sanitization chamber 52. Alternatively or in addition, sanitization structure 66 may include sources of energy for exposing the liquid that flows through sanitization chamber 52 to sanitizing energy. For example, sanitization structure 66 may include a plurality (e.g., eight or another number) of light emitting diode assemblies, tube lamp assemblies, or other radiation sources for emitting sanitizing radiation (e.g., germicidal ultraviolet C radiation, or another type of radiation). When sanitization structure 66 is configured to emit sanitizing radiation, interior surfaces of sanitization chamber 52 may be configured to reflect or diffuse the radiation so as to facilitate exposure of the liquid to the radiation.

Different embodiments are disclosed herein. Features of certain embodiments may be combined with features of other embodiments; thus, certain embodiments may be combinations of features of multiple embodiments. In particular, details and variants in the function and structure of a sanitization chamber that are described in connection with one example of a pool cleaner, are applicable to other described examples of pool cleaners.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:
1. A pool cleaner comprising:
a housing, comprising at least one liquid inlet and at least one liquid outlet;
a propulsion system for propelling the pool cleaner over a submerged surface of a pool;

a suction system comprising a motorized pump, the suction system being configured to draw liquid from the pool through the at least one liquid inlet, and to expel the liquid back into the pool through the at least one liquid outlet;

a filter configured to trap debris in the drawn liquid; and a sanitization chamber including at least one chamber inlet and at least one chamber outlet, the sanitization chamber being located downstream of the filter and upstream of the pump, said at least one chamber inlet configured to divert a fraction of the liquid flowing from the filter and toward the pump through the sanitization chamber and out through said at least one chamber outlet while the remainder of the liquid bypasses the chamber to the pump, the sanitization chamber configured to sanitize the liquid that is flowing through the sanitization chamber and to retard a flow rate of the liquid that is flowing through the sanitization chamber relative to a flow rate of the remainder of the liquid.

2. The pool cleaner of claim 1, wherein said at least one chamber inlet is located adjacent to a downstream side of the filter, an area of said at least one chamber inlet covering a fraction of an area of the filter.

3. The pool cleaner of claim 2, wherein said fraction of an area is less than 50%.

4. The pool cleaner of claim 1, wherein the sanitization chamber is enclosed within the housing.

5. The pool cleaner of claim 1, wherein said at least one chamber outlet is upstream of the pump.

6. The pool cleaner of claim 1, wherein said at least one chamber outlet comprises a plurality of outlet ports.

7. A pool cleaner comprising:

a housing, comprising at least one liquid inlet and a liquid outlet;

a propulsion system for propelling the pool cleaner over a submerged surface of a pool;

a suction system comprising a motorized pump, the suction system being configured to draw liquid from the pool through the at least one liquid inlet, and to expel the liquid back into the pool through the at least one liquid outlet;

a filter configured to trap debris in the drawn liquid;

a conduit to guide the liquid to flow from the pump to the liquid outlet, a wall of the conduit including one or a plurality of openings; and a sanitization chamber at least partially surrounding the conduit, the sanitization chamber including at least one interior port that is open to an interior of the housing such that a fraction of the liquid that is flowing from said at least one liquid inlet toward said at least one liquid outlet is diverted to flow through the chamber while a remainder of the liquid bypasses the sanitization chamber to flow directly to said at least one liquid outlet, an interior of the sanitization chamber being open to the conduit via said one or a plurality of openings to enable a flow of the liquid through the sanitization chamber between said one or a plurality of openings and said at least one interior port, the sanitization chamber configured to sanitize the liquid that is flowing through the sanitization chamber and to retard a flow rate of the liquid that is flowing through the sanitization chamber relative to a flow rate of the remainder of the liquid.

8. The pool cleaner of claim 7, wherein said at least one interior port is located upstream of the pump.

9. The pool cleaner of claim 8, wherein said plurality of openings are located downstream from the pump.

10. The pool cleaner of claim 7, wherein said at least one interior port is located downstream from the filter.

11. The pool cleaner of claim 7, wherein outer walls of the sanitization chamber substantially form a rectangular box.

* * * * *